United States Patent Office 3,095,420
Patented June 25, 1963

3,095,420
RESOLUTION OF β- AND γ-PICOLINE MIXTURES
William D. Schaeffer, Pomona, Calif., assignor to Union Oil Company of California, Los Angeles, Calif., a corporation of California
No Drawing. Filed Apr. 8, 1960, Ser. No. 20,831
17 Claims. (Cl. 260—290)

This invention relates to a novel method for separating mixtures of β- and γ-picoline, to obtain, if desired, pure β-picoline and/or pure γ-picoline. Briefly, the method consists in first intimately admixing and bringing into substantial chemical equilibrium, the following components:

(1) A divalent transitional metal thiocyanate,
(2) A mixture of β- and γ-picolines,
(3) An organic compound which (a) forms a relatively stable clathrate with the Werner complex resulting from the combination of four moles of one of the picoline isomers with one mole of the metal thiocyanate, but (b) does not form a clathrate, or forms a much weaker clathrate, with the corresponding Werner complex resulting from the combination of the other picoline isomer with the metal thiocyanate.

Preferably, a liquid medium is used in the reaction which is a good solvent for component (2), but is, or can be rendered, substantially a nonsolvent for the Werner complexes formed by the combination of components (1) and (2). This facilitates the final separation of a liquid phase rich in one picoline isomer from the solid clathrate phase which is rich in the other isomer.

It is preferred that not substantially more than one mole of the metal thiocyanate be present for each four moles of the picoline isomer whose Werner complex forms a clathrate with component (3). The resulting mixture at equilibrium will then comprise a liquid phase enriched in one of the picoline isomers, and a solid clathrate phase enriched in the other picoline isomer. An appropriate phase separation is then effected, and the respective isomers are recovered from each phase, as by distillation, solvent extraction, or steam stripping.

The chemical equilibria involved in the process may be illustrated (though perhaps in oversimplified form) by the following equations, where naphthalene is used as component (3):

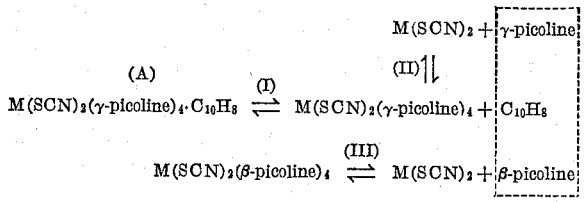

Reaction (I) is driven substantially to completion to the left because of several factors. Firstly, the clathrate compound (A) represents the lowest energy level in the system and hence there is a driving force favoring its formation. Secondly, an excess of naphthalene is preferably used, thereby driving reaction (I) further to completion. The leftward completion of reaction (I) in turn favors the downward completion of reaction (II). Thirdly, if only sufficient thiocyanate is used to complete reaction (II), then reaction (II) will be driven substantially to completion to the right. Hence, where a solvent is used, of the original materials in solution (represented by the dotted rectangle), substantially only the β-picoline and excess naphthalene will remain. Most or all of the γ-picoline will be in the solid phase, and can be recovered by thermal decomposition, dissolving the clathrate in a solvent, or the like. The β-picoline is easily recovered from the solution by distillation.

Where chloroform is used as component (3), the picoline isomers are distributed in the reverse phases, due to the fact that the β-picoline Werner complex forms a much more stable clathrate with chloroform than does the γ-picoline complex:

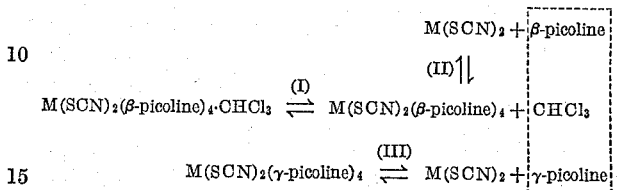

Hence, in this case, purified γ-picoline is recovered from the solvent phase, and purified β-picoline from the solid phase.

The foregoing equations represent somewhat of an oversimplification of the equilibria involved, because the metal thiocyanates are theoretically capable of forming mixed Werner complexes with both of the picoline isomers, i.e., hetero(tetra-picoline) complexes. However, the homo(tetra-picoline) complexes, wherein each molecule of complex contains four molecules of the same picoline isomer, appear to be the ones which most readily form clathrates with the clathratable compounds herein specified. The hetero(tetra-picoline) complexes hence tend to equilibrate to the particular homo(tetra-picoline) complex which most readily forms a clathrate.

It will be apparent from the foregoing that the principal object of this invention is to provide simple and economical methods for resolving mixtures of β- and γ-picolines, so that one or both of the isomers may be recovered either in enriched or substantially pure form. In the past, this has been a very difficult problem, which in recent years has become more acute because of the increasing demand for the pure isomers as starting materials for the preparation of nicotinic and isonicotinic acids, as well as other derivatives.

The term "clathrate" is used herein in the same sense as in my U.S. Patent No. 2,798,981, which discloses the use of Werner complexes as selective clathrate-formers for separating non-Werner-complex-forming aromatic isomers. The present invention differs from that of the patent in that I am here effecting a separation, not of two different inert compounds, but of two different Werner-complex-forming nitrogen bases, whose Werner-complex-forming affinity is approximately the same.

The metal thiocyanates employed herein comprise the thiocyanates of transitional divalent metals, e.g., manganese, iron, cobalt, nickel, copper, zinc, cadmium, mercury, and the like. The preferred metals comprise those of atomic numbers 25 to 28, i.e., manganese, iron, cobalt, and nickel. Any proportion of such metal thiocyanates will effect some degree of resolution, but it is preferred to use substantially one mole, i.e., about 0.8 to 1.2 moles, for each four moles of the particular picoline isomer which is to be segregated in the solid phase. If larger amounts are used, then a relatively larger proportion of the other picoline isomer will appear in the solid phase; if smaller amounts are used, there will be an incomplete recovery of the isomer segregated in the solid phase, but normally it will be recovered in purer form.

The solvents which may be employed herein may consist of any compound or mixture of compounds having the desired physical properties, and which is sufficiently stable under the conditions of use. It is preferred to use a solvent with a higher boiling point than the picolines in order that the picolines may be readily separated therefrom by distillation. Suitable solvents include, for example, high-boiling hydrocarbons in the kerosene range, solvent naphthas, gas oils and the like, any of which may comprise paraffinic, naphthenic, or aromatic components. Other suitable solvents include, for example, the aliphatic alcohols and glycols, as well as glycol mono-ethers, and alkanolamines. Specifically, methanol, ethanol, isopropanol, dodecanol, ethylene glycol, propylene glycol, methyl Cellosolve, mono-ethanolamine, di-ethanolamine, N-methyl ethanolamine and mixtures of such compounds may be employed. Some of these solvents, e.g., methyl Cellosolve and ethanolamine, exhibit an undesirably high solvent capacity for the Werner complexes. This difficulty may be overcome by using lower temperatures, or preferably by admixing the solvent with a paraffin hydrocarbon, a lower monohydric alcohol, a glycol, or water. An especially preferred solvent is a water-monoethanolamine mixture containing about 40–80% by weight of water. In general, it may be said that any solvent may be used which is compatible with the other components of the system, and in which the picolines, and preferably, but not necessarily, the clathratable organic compound, are at least fairly soluble, but in which the solid Werner complexes (and necessarily the clathrates formed therefrom) are substantially insoluble at low temperatures of e.g., 0–50° C. It is preferable, however, that the solvent display at least some solvent capacity for the Werner complexes at elevated temperatures of, e.g., 50–100° C., whereby the attainment of equilibrium may be hastened.

Another type of solvent which can be used herein comprises mixtures of water with ammonia, or with volatile aliphatic amines, e.g., methylamine, di-methylamine, ethylamine, di-ethylamine and the like. Such mixtures may contain from about 5% to 50% by weight of ammonia or amine, and will dissolve substantial amounts of the Werner complexes. These mixtures do not, however, exhibit a large temperature coefficient of solubility for the Werner complexes, and hence, where the original mixture is sufficiently concentrated in ammonia or amine to dissolve appreciable amounts of the Werner complex, the excess ammonia or amine may be volatilized to complete the desired precipitation of clathrate.

In one modification, an excess of the clathratable component, e.g., naphthalene, may be used as the solvent. An excess of chloroform may also comprise the essential solvent component, provided that its high solvent capacity for the Werner complexes be suitably modified by addition of a non-solvent, e.g., kerosene, pentane, etc.

A wide variety of organic compounds may be employed as the clathratable component. The principal operative requirement is that such component be capable of forming a more stable clathrate with the Werner complex of one of the picoline isomers than with the Werner complex of the other picoline isomer, or with mixed picolines. Compounds which form clathrates with the gamma-picoline Werner complexes in preference to the beta-picoline complexes include, in general, aromatic compounds such as benzene, mono-substituted benzenes, para-di-substituted benzenes, naphthalene, 1-substituted naphthalenes, thiophene, methyl thiophenes, and the like, provided that the substituent groups on the respective rings are chemically inert to the other reactants. Preferably, each substituent should contain less than about 6 atoms. Suitable ring-substituents include, for example, methyl, ethyl, propyl, isopropyl, halogen, nitro, amino, lower alkylamino, lower alkoxy, hydroxyl, lower alkyl carbonyl, lower carbalkoxyl, sulfhydryl and the like. Specific examples of suitable compounds include benzene, toluene, phenol, anisole, aniline, N-methyl aniline, nitrobenzene, methyl phenyl ketone, phenyl acetate, thiophenol, p-xylene, ethylbenzene, p-cymene, p-chlorotoluene p-dichlorobenzene, p-dibromobenzene, p-toluidine, p-nitrotoluene, p-cresol, p-methylanisole, naphthalene, 1- methyl-naphthalene, and the like. The preferred compounds are benzene, toluene, p-xylene and naphthalene. In general, the aromatic compounds exhibit a stronger tendency to form clathrates with the gamma-picoline Werner complexes than with the beta-picoline complexes.

Where it is desired to segregate the beta-picoline in the solid phase, suitable clathratable compounds include, in general, the halogenated lower aliphatic compounds containing not more than 4 carbon atoms, such as chloroform, carbon tetrachloride, bromoform, pentachloro ethane, alphachloroethanol, and the like.

Any amount of the foregoing clathratable components is effective in some degree. It is preferred, however, to use a substantial mole-excess thereof relative to its clathrate-combining ratio, which is usually about one mole per mole of Werner complex, or 0.25 mole per mole of the picoline isomer to be segregated in the solid phase. As indicated above, such mole-excesses of the clathratable component tend to drive the clathrate reaction to completion, resulting in maximum purity of the picoline isomers recoverable from the respective phases. Suitable amounts include, for example, from about 0.2 to 20 moles, and preferably about 0.3 to 10 moles, per mole of the picoline isomer to be segregated in the solid phase.

The technique of carrying out the reaction involves basically a simple mixing of the reactants, and the solvent if desired, at temperatures favorable to the formation of a clathrate. Such temperatures lie within the range of about −20° to 100° C., and preferably between about 10° and 75° C. Temperatures in excess of 100° usually result in substantial dissociation of the clathrate compounds, and some dissociation of the Werner complexes. Upon mixing and agitating all the components at the desired temperature, substantial equilibrium of the reactions involved is usually reached in about ten minutes to two hours. When this point is reached, it is preferable to cool the mixture to as low a temperature as is consistent with good handling properties, thereby effecting a more complete precipitation of solid clathrate. The solid phase is then separated by any conventional means such as filtration, decantation, centrifuging, etc. The liquid phase will contain one of the picoline isomers in pure or concentrated form, as well as the excess of clathratable component. The picoline isomer is then separated therefrom by any conventional means such as distillation, stripping, precipitation or the like. Distillation is usually the preferred method, especially where the excess clathratable component is higher boiling than the picolines. In cases where the clathratable component is lower boiling than the picolines, an additional fractionation step is involved to separate the picoline therefrom.

The solid clathrate phase separated from the solvent mixture is preferably washed with a portion of the pure solvent employed, and may then be treated to decompose the clathrate, and to decompose at least partially the Werner complex itself in order to effect recovery of the picoline isomer contained therein. Suitable methods for decomposition include, for example, heating, stripping with hot liquids or gases, e.g., steam, dissolving the clathrate in a solvent, decomposing with acid or the like. It is, of course, preferable to recover the metal thiocyanate in suitable condition for recycle to the first step. For this purpose, thermal decomposition, with or without stripping, is suitable. A preferred procedure consists in merely adding the solid clathrate to the solvent from which the other picoline isomer has been stripped, and then subjecting the slurry to distillation or stripping to recover the second picoline isomer. The residue from this distillation or stripping operation will then consist of the solvent, the metal thiocyanate and the clathratable component, provided that the latter is higher boiling than the picolines.

To illustrate graphically the preferred manner of operation, using naphthalene for the clathrate component, the following flow diagram is presented:

FLOW DIAGRAM 1

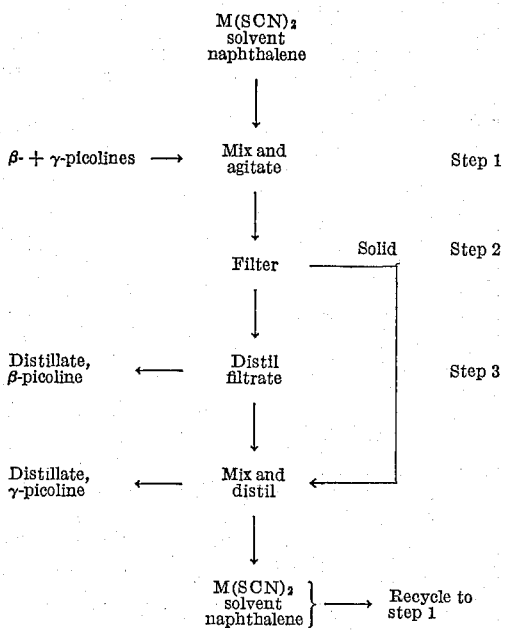

A suitable solvent for the above process may be, for example, kerosene. Kerosene may also be used where chloroform is used as the clathratable component, as indicated in the following flow diagram:

FLOW DIAGRAM 2

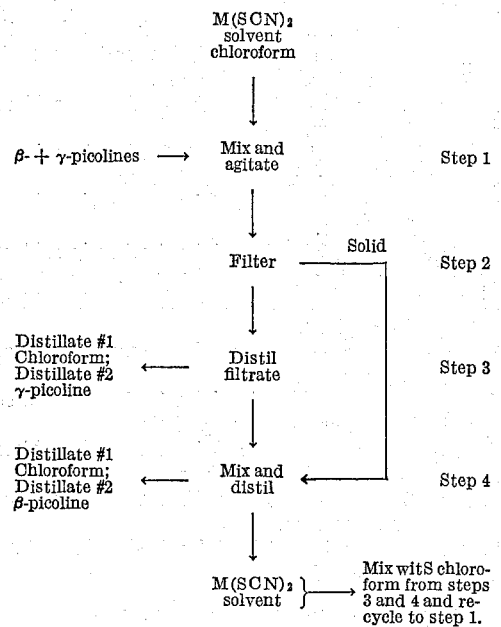

The procedure of the above flow diagrams is more specifically illustrated by the following examples, which should not, however, be construed as limiting in scope.

*Example I*

To a mixture containing 500 ml. of kerosene, 19.5 grams (0.15 mole) of naphthalene and 17.5 grams (0.1 mole) of nickel thiocyanate, is added 74.5 grams (0.8 mole) of a 1:1 mixture of beta- and gamma-picolines. The mixture is then warmed at 50° C. with stirring for 15 minutes, then cooled to 30° C. and the blue solid filtered off. The filtrate is subjected to fractional distillation and the overhead (boiling point 140–143° C.) is found to be highly enriched in beta-picoline as compared to the original mixture.

When distillation of the beta-picoline from the kerosene solvent is complete, the blue solid obtained above as a filter cake is remixed with the kerosene and distillation resumed. The overhead fraction obtained (boiling point 140–144° C.) is found to be highly enriched in gamma-picoline. The distillation residue now consists of a mixture of kerosene, naphthalene and nickel thiocyanate corresponding to the original mixture, and is suitable for reuse.

*Example II*

To a mixture containing 500 ml. of kerosene, 24 grams (0.2 mole) of chloroform and 17.1 grams (0.1 mole) of manganese thiocyanate, is added 74.5 grams (0.8 mole) of a 1:1 mixture of beat- and gamma-picoline. The mixture is warmed at 40° C. with stirring for about 20 minutes, then cooled to 20° C., and the blue solid filtered off. The filtrate is subjected to fractional distillation to recover overhead a first fraction which is chloroform, and a second fraction boiling at 140–144° C. which is essentially gamma-picoline.

When distillation of the gamma-picoline from the solvent is complete, the blue solid obtained above as a filter cake is remixed with the kerosene and distillation resumed. A small amount of chloroform is recovered as a first overhead, and then a second overhead fraction boiling at 140–143° C. is recovered which is essentially beta-picoline. The distillation residue then comprises essentially kerosene and manganese thiocyanate, which upon being remixed with the chloroform recovered by distillation is suitable for reuse.

*Example III*

This example illustrates the use of aqueous ammonia as the clathration medium. To a 300 ml. 3-necked flask equipped with a stirrer, thermometer and condenser was added 7.47 grams (0.043 mole) of $Ni(SCN)_2$, 76.6 grams of 20.9% aqueous ammonia, and 31.8 grams (0.342 mole) of mixed 3- and 4-methylpyridine (50% 3-methylpyridine and 50% 4-methylpyridine). The resulting deep blue solution was treated with 20 ml. of toluene (to selectively form a clathrate compound with the 4-methylpyridine complex), then ammonia was evaporated off under reduced pressure while maintaining the internal temperature between 35° and 40° C. As the ammonia was removed, blue crystals formed in the toluene phase. When ammonia removal was complete, the mixture was cooled to 25° C. and stirred for 30 minutes, then 40 ml. of isooctane was added and after two minutes of stirring the mixture was filtered. The solid on the filter and the filtrate were worked up separately.

*Filtrate work-up.*—The filtrate consisted of two liquid phases: an upper hydrocarbon-rich phase and a lower aqueous phase. These phases were separated and the aqueous phase was then extracted four times with 50 ml. portions of a 1:1 (by volume) isooctane-benzene mixture. The combined hydrocarbon extracts were analyzed by infrared spectroscopy and the results are shown in Table 1.

*Solid work-up.*—The solid was transferred to a beaker and dissolved in 50 ml. of 28% aqueous ammonia. The blue solution obtained was extracted four times with 50 ml. portions of 1:1 (by volume) benzene-isooctane mixture. The combined hydrocarbon-rich extracts were combined and analyzed. The results were as follows:

TABLE 1

| Fraction | Analyses, Vol. Percent | | Recovery [a] | |
|---|---|---|---|---|
| | 3-methyl-pyridine | 4-methyl-pyridine | 3-methyl-pyridine | 4-methyl-pyridine |
| Feed | 50 | 50 | | |
| methylpyridines from filtrate | 78 | 22 | 71.7 | 20.2 |
| methylpyridines from clathrate | 22 | 78 | 25.0 | 78.4 |

[a] Vol. percent of isomer charged recovered in that phase.

*Example IV*

This example illustrates the use of mono-ethanolamine as the solvent, and p-xylene as the clathratable compound.

To a 250 ml. flask equipped with a stirrer and thermometer was added 11.17 grams of nickel thiocyanate, 47.6 grams of mixed beta- and gamma-picolines, 25 ml. of ethanolamine, 35.2 ml. of water, and 45.2 grams of a 40% aqueous solution of ethanolammonium thiocyanate. (The latter solution was used to lower the solubility of the Werner complex.) The mixture was heated to solution (85° C.), then 30 ml. of p-xylene was added and the mixture was cooled to 0° C., stirred 10 minutes and filtered. The filter cake was washed with 65 ml. of isooctane. The filtrate separated into an aqueous phase a hydrocarbon phase, and the aqueous phase was extracted twice with 80 ml. portions of 20% p-xylene-80% isooctane mixture, and the extracts were combined for picoline analysis.

The solid clathrate was then dissolved in concentrated ammonia and extracted twice with 80 ml. portions of 20% p-xylene-80% isooctane mixture, and the extracts were combined for picoline analysis. The results of the analyses were as follows:

TABLE 2

| Fraction | Weight percent | |
|---|---|---|
| | gamma-picoline | beta-picoline |
| Feed | 58.2 | 41.8 |
| Clathrated | 81.0 | 19.0 |
| Non-clathrated | Nil | 100 |

The effectiveness of this single-stage resolution is readily apparent.

This application is a continuation-in-part of my prior copending application Serial No. 737,501, filed May 26, 1958, now abandoned.

Obviously, many other techniques than those above illustrated may be employed for mixing the ingredients, separating the solid phase, and recovering the picoline isomers from their respective phases. Any such operable methods are contemplated herein. The true scope of the invention is intended to be embraced by the following claims.

I claim:

1. A method for recovering in purified form a picoline isomer selected from the group consisting of β-picoline and γ-picoline from a mixture containing the said isomers, which comprises intimately contacting and reacting the following components: (1) a thiocyanate of a divalent transitional metal, (2) a mixture of β- and γ-picolines, and (3) an organic compound capable of forming a clathrate with one of the homo-(tetra-picoline) Werner complexes formed by the reaction of said components (1) and (2), but which is relatively incapable of forming a clathrate with the other of said homo-(tetra-picoline) Werner complexes, separating an unreacted picoline phase from the resulting solid phase, and recovering from at least one of said phases a picoline fraction enriched in one of the said isomers thereof; said organic compound (3) being selected from the class consisting of benzene, mono-substituted benzenes, para di-substituted benzenes, naphthalene, 1 - substituted naphthalenes, thiophene, methyl thiophenes, and substituted aliphatic hydrocarbons containing not more than four carbon atoms joined one to another in a saturated chain and having at least one substituent, said substituent being selected from the class consisting of chlorine, bromine, and hydroxyl, said substituted aliphatic hydrocarbon always having at least one substituent selected from the class consisting of bromine and chlorine, any ring-substituents on said organic compounds being selected from the class consisting of lower alkyl, chlorine, bromine, nitro, amino, lower alkyl amino, lower alkoxy, hydroxyl, lower alkyl carbonyl, lower carbalkoxyl, and sulfhydryl.

2. A method as defined in claim 1 wherein said contacting step is carried out in the presence of a solvent in which said picolines are relatively soluble but in which said Werner complex is relatively insoluble at temperatures of 0°–50° C.

3. A method as defined in claim 2 wherein said solvent is aqueous ammonia.

4. A method as defined in claim 2 wherein said solvent is an aqueous solution of a lower alkanolamine.

5. A method as defined in claim 2 wherein said solvent is an aqueous solution of mono-ethanolamine.

6. A method as defined in claim 1 wherein an excess of said component (3) is employed, over the amount thereof which is clathratable in said system.

7. A method as defined in claim 1 wherein said metal thiocyanate is employed in a mole-ratio of substantially 1:4 with respect to the one of said picoline isomers which is to be recovered in said solid phase.

8. A method as defined in claim 1 wherein said component (3) is benzene.

9. A method as defined in claim 1 wherein said component (3) is a lower monoalkyl benzene.

10. A method as defined in claim 1 wherein said component (3) is toluene.

11. A method as defined in claim 1 wherein said component (3) is a lower p-dialkyl benzene.

12. A method as defined in claim 1 wherein said component (3) is p-xylene.

13. A method as defined in claim 1 wherein said component (3) is naphthalene.

14. A method as defined in claim 1 wherein said component (3) is a lower 1-alkyl naphthalene.

15. A method as defined in claim 1 wherein said component (3) is 1-methyl naphthalene.

16. A method as defined in claim 1 wherein said component (3) is chloroform.

17. A method as defined in claim 1 wherein said metal thiocyante is nickel thiocyanate.

References Cited in the file of this patent
UNITED STATES PATENTS
2,798,891    Schaeffer _____ July 9, 1957